Patented June 23, 1936

2,045,551

UNITED STATES PATENT OFFICE 2,045,551

METHOD FOR PREVENTING FOAM

Carl Iddings, Staten Island, and John N. Kennedy, Brooklyn, N. Y., assignors to The Muralo Company, Inc., a corporation of New York No Drawing. Application September 9, 1935,
Serial No. 39,862

13 Claims. (Cl. 134—50)

The problem of foam in the paint and allied industries has always been of major importance, since the presence of foam in any applied film is usually highly objectionable because of the resulting rough surface and pit holes produced.

The problem has been especially evident in the casein industry because of the fact that those materials which dissolve and/or disperse casein, such as ammonium fluoride, sodium fluoride, and alkalis including caustic soda, borax, hydrated lime, etc., produce solutions and/or dispersions which are foamy. This is particularly true where these solutions and/or dispersions are employed in the production of paints, inasmuch as the presence of finely divided pigments tend to stabilize the foam.

As an example of these difficulties, it has been noted that a casein powder paint comprising casein, hydrated lime, clay, whiting and a preservative, upon mixture with water for the production of a paint of proper brushing consistency, will become quite foamy and therefore unsatisfactory, the foam persisting even after the paint has been brushed out. The effect of foaminess becomes even more marked when, for example, a portion of the whiting in the above illustration is replaced by an even more finely divided pigment such as lithopone.

The prior art teaches the use of pine oil for the abatement of foam in such paints, usually in amounts of 1 to 2%. It is true that pine oil acts simultaneously as a preservative against attack by micro-organisms and as a very effective defoamer, tending to reduce the amount of foam formed while mixing the materials, and breaking the foam practically instantly upon brushing out the paint.

A serious objection to pine oil however, is its characteristic sharp penetrating odor which is prevalent during the application of the coating material. Besides, when used in sufficiently large amounts, pine oil causes a slight temporary irritation to the eyes.

Other defoamers are also well known to the industry and include such materials as octyl alcohols and similar derivatives. In view of the fact that these agents are far less effective than pine oil, yet considerably more expensive, they fail to replace pine oil in practical usefulness.

By this invention it is proposed to solve the problem of foaminess as it exists in the manufacture of paints and allied products, and particularly as met in the casein industry where the solvent and/or dispersing agent tends to produce foamy products. Since the problem is substantially the same in casein paints of both paste and powder types, it is intended that the defoaming agent of the present invention serve in both types. It is likewise proposed to overcome the objection of known defoamers as to odor, price and effectiveness, by the use of diethyl phthalate as a defoaming agent.

Diethyl phthalate has been employed for various purposes in the past, as a plasticizer for example, but its use to overcome foam has never been heretofore suggested, nor has it been before contemplated that it serve in any capacity in a paint having an aqueous vehicle or in conjunction with a solution and/or dispersion of casein of any type.

It has been found as the result of experiment that diethyl phthalate when used in reasonably small proportions compares favorably with pine oil for purposes of defoaming. It is not contended, however, that diethyl phthalate is the bactericidal equivalent of pine oil, but when employed in casein paste and powder paints, it is at least equal to pine oil in its foam abating properties. Furthermore, diethyl phthalate is far superior to pine oil from the standpoint of odor, since little or no odor is experienced with the former.

Quantities of diethyl phthalate of the order of ½ to 2%, based upon the weight of the paint, have been successfully employed to inhibit foam, but such proportions are not to be limiting, since it is obvious that greater or lesser amounts may exhibit desirable qualities as defoaming agents.

The unusual and unexpected property of diethyl phthalate in this behalf is emphasized by the fact that its homologues, dimethyl phthalate and dibutyl phthalate, which are otherwise similar in many properties and uses fail to produce the defoaming effect.

The diethyl phthalate may be added to the powder in the case of a powder paint, or to the paste or casein solution and/or dispersion in the case of a paste paint. It is also contemplated that the diethyl phthalate be added at any other stage of the production of these paints, with any one or more of the ingredients thereof. For example, the diethyl phthalate may be added to an otherwise completed dry or paste paint, or it may be added to the water employed for diluting a paste paint or that used for mixing a powder paint to brushing consistency.

Examples of powder and paste casein paints respectively utilizing diethyl phthalate as a defoamer are given by the following typical compositions.

*Example A.—Powder*

| | Parts |
|---|---|
| Preservative | 0.05 |
| Hydrated lime | 15.10 |
| Clay | 3.00 |
| Whiting | 30.15 |
| Talc | 37.40 |
| Diethyl phthalate | 2.00 |
| Casein | 12.30 |

*Example B.—Paste*

| | Parts |
|---|---|
| Casein solution | 39.2 |
| Diethyl phthalate | 0.8 |
| Lithopone | 25.0 |
| Talc | 22.5 |
| Clay | 12.5 |

Since various proportions of the diethyl phthalate have been tried, all with success, there is every reason to believe that all reasonable percentages will be productive of the desired antifoaming effects.

It will be clear of course, that the action of diethyl phthalate as a defoaming agent is not restricted to casein compositions, since it has served very effectively as a defoamer in calcimines and other glue bound paints, as well as in paints bound with gum. It is intended therefore, that unless otherwise restricted, the appended claims will cover such other uses of the defoaming agent.

Reference to a "casein solution" in the accompanying claims should be construed to include a solution and/or dispersion of casein. Similarly the term "casein solvent" should be interpreted as a solvent and/or dispersing agent for casein.

We claim:

1. A composition of matter comprising casein, a solvent therefor and diethyl phthalate in sufficient proportions to serve as a defoaming agent.

2. A composition of matter comprising casein and a solvent therefor in powder form and diethyl phthalate in sufficient proportions to serve as a defoaming agent.

3. A composition of matter comprising a casein solution and diethyl phthalate in sufficient proportions to serve as a defoaming agent.

4. A paint composition having an aqueous vehicle and possessing a normal tendency to foam having diethyl phthalate incorporated therein in sufficient proportions to serve as a defoaming agent.

5. A composition of matter possessing a normal tendency to foam upon mixing with an aqueous vehicle to form a coating composition, to which diethyl phthalate has been added to serve as a defoaming agent.

6. A paint composition comprising casein, a solvent therefor, a finely divided pigment and diethyl phthalate in sufficient proportions to serve as a defoaming agent.

7. The method of preventing foam in a casein solution comprising adding thereto diethyl phthalate.

8. The method of preventing foam in a paint having an aqueous vehicle and possessing a normal tendency to foam comprising adding thereto diethyl phthalate.

9. The method of preventing foaming of a casein powder paint containing a pigment comprising incorporating diethyl phthalate in the powder.

10. The method of preventing foaming of a casein paste paint containing a pigment comprising incorporating diethyl phthalate in the paste.

11. The method of preventing foam in a coating composition having an aqueous vehicle and possessing a normal tendency to foam comprising adding thereto diethyl phthalate.

12. The method of preventing foam in a casein paint comprising adding thereto ½% to 2% diethyl phthalate based upon the weight of the paint.

13. A casein paint composition having incorporated therewith to inhibit foam ½% to 2% diethyl phthalate, based upon the weight of the paint.

CARL IDDINGS.
JOHN N. KENNEDY.